United States Patent
Perez

(10) Patent No.: US 9,266,430 B1
(45) Date of Patent: Feb. 23, 2016

(54) MULTI-GAUGE POD INTEGRATABLE WITHIN MOTORCYCLE WINDSCREEN

(71) Applicant: Carlos Ariel Perez, Wesley Chapel, FL (US)

(72) Inventor: Carlos Ariel Perez, Wesley Chapel, FL (US)

( * ) Notice: Subject to any disclaimer, the term of this patent is extended or adjusted under 35 U.S.C. 154(b) by 0 days.

(21) Appl. No.: 14/109,423

(22) Filed: Dec. 17, 2013

(51) Int. Cl.
  B60J 1/02 (2006.01)
  B62J 17/04 (2006.01)
  B62D 25/08 (2006.01)
  B60K 37/02 (2006.01)

(52) U.S. Cl.
  CPC .. *B60K 37/02* (2013.01); *B60J 1/02* (2013.01); *B62D 25/081* (2013.01); *B62J 17/04* (2013.01)

(58) Field of Classification Search
  CPC .......... B60J 1/02; B62J 17/04; B62D 25/081; B60K 37/02
  USPC ........................ 296/78.1, 84.1, 77.1, 70, 208; 280/288.4
  See application file for complete search history.

(56) References Cited

U.S. PATENT DOCUMENTS

| | | |
|---|---|---|
| D244,183 S | 5/1977 | Gordon |
| 4,652,870 A | 3/1987 | Steward |
| D453,715 S | 2/2002 | Nakazawa et al. |
| D455,678 S | 4/2002 | Schroeder et al. |
| D456,754 S | 5/2002 | Keating |
| D470,090 S | 2/2003 | Sawabe |
| D482,644 S | 11/2003 | Meier |
| 6,705,659 B2 * | 3/2004 | Suzuki et al. ................... 296/70 |
| D524,178 S | 7/2006 | Wu |
| D525,923 S | 8/2006 | Kudo et al. |
| 7,187,270 B2 | 3/2007 | Kushida et al. |
| 7,271,760 B2 * | 9/2007 | Bartosik et al. ................. 342/20 |
| 7,681,901 B2 * | 3/2010 | LaCour ..................... 280/288.4 |

* cited by examiner

*Primary Examiner* — Joseph D Pape
*Assistant Examiner* — Dana Ivey
(74) *Attorney, Agent, or Firm* — Glenn E. Gold; Gold & Rizvi, P.A.

(57) ABSTRACT

A multi-gauge pod integratable with a motorcycle windscreen includes a front panel having an upper edge of a curved configuration conforming to the curvature of a semi-conical wedge-shaped shell portion of the windscreen, a lower edge below and spaced from the upper edge, and plural openings formed in the front panel spaced apart from one another and disposed in a clustered arrangement between and spaced from the upper and lower edges such that the front panel provides a dashboard that integrates within the motorcycle windscreen with the openings providing sites for mounting gauges thereto. The pod also includes a base and may include a tunnel both rigidly connected along front edges thereof to the lower edge of the front panel and extending rearward therefrom so as to rigidly support the front panel in an upright position relative to the base.

17 Claims, 6 Drawing Sheets

MULTI-GAUGE POD INTEGRATABLE WITHIN MOTORCYCLE WINDSCREEN

FIELD OF THE INVENTION

The present invention relates to motorcycle accessories and, more particularly, is concerned with a multi-gauge pod which is integratable within a high-profile motorcycle windscreen.

BACKGROUND OF THE INVENTION

A high-profile style windscreen for use on a motorcycle is formed with a generally semi-conical wedge-shaped shell portion in the center of the windscreen. This central shell portion aerodynamically shapes the windscreen to allow wind/air to pass over the head of a motorcycle rider who is crouched down while riding the motorcycle, which is the conventional position for certain motorcycles. Thus, the semi-conical wedge-shaped shell portion is designed to provide superior aerodynamics for a motorcycle rider generally tucked in behind the windscreen.

Such high-profile motorcycle windscreens, such as, for example, a so-called double bubble style windscreen, is normally free and independent of any gauges on the motorcycle. Gauges may be provided on an instrument panel board on the body of the motorcycle spaced below the windscreen. As seen in U.S. Pat. No. 7,187,270, the gauges may be a centrally-placed speedometer gauge and fuel and water temperature gauges placed on the left and right sides of the speedometer gauge spaced below the windshield. This placement of these gauges is likely to be somewhat below the field of view of the rider. This requires the rider, who should be looking forward to see the road ahead, to look down to view the gauges. By distracting the rider in this way from keeping his or her eyes on the road, the placement of these gauges would seem to pose a safety hazard at least for some riders.

Motorcycles ordinarily have at least speedometer/odometer gauge. In situations where owners desire to also mount other types of gauges on their motorcycles, there are various types of brackets that are commercially available to use in mounting the extra gauges, although in what seems at times to amount to a jerry-built manner on whatever existing structures and surfaces happen to be available. This situation only tends to exacerbate the above-mentioned safety hazard problem.

Accordingly, there remains a need in the art for an innovation that will overcome the deficiencies of the known art and the problems that remain unsolved.

SUMMARY OF THE INVENTION

The present invention provides an innovation in the form of a multi-gauge pod that overcomes the deficiencies of the known art and the problems that remain unsolved. The multi-gauge pod is integratable within the high profile windscreen so as to allow a motorcycle rider to view the various gauges without having to look down. The multi-gauge pod eliminates the above-mentioned safety hazard problem by allowing the motorcycle owner to organize the extra gauges in a clustered arrangement integrated within the semi-conical wedge-shaped shell portion of the high profile windscreen so as to provide a dashboard integrated within the shell portion at a location in the center of the high profile windscreen. Furthermore, the inventive pod allows motorcycle owners the ability to implement after-market gauges and instrumentation into the windscreen for better in-line sight use, while also allowing the owner to utilize the stock instrumentation without obstructing view of the motorcycle factory-installed instrumentation.

In one aspect of the present invention, a multi-gauge pod integratable within a motorcycle windscreen includes:
a front panel having
an upper edge of a curved configuration conforming to the curvature of a semi-conical wedge-shaped shell portion of a high profile motorcycle windscreen,
a lower edge below and spaced from the upper edge, and
a plurality of openings formed in the front panel spaced apart from one another and disposed in a clustered arrangement between and spaced from the upper and lower edges such that the front panel provides a dashboard that integrates within the high profile motorcycle windscreen, the openings providing sites for mounting gauges thereto; and
a base rigidly connected along a front edge thereof to the lower edge of the front panel and extending rearward therefrom so as to rigidly support the front panel in an upright position relative to the base, the base being attachable to one of the motorcycle and high profile motorcycle windscreen along opposite outer side edges of the base.

In another aspect of the present invention, a multi-gauge pod integratable with a high profile motorcycle windscreen includes:
a front panel having
an upper edge having an upper central edge portion of an arch-shaped configuration conforming to the configuration of a semi-conical wedge-shaped shell portion of a high profile motorcycle windscreen,
a lower edge having a lower central edge of an arch-shaped configuration spaced below said upper central edge portion of said upper edge and spaced from said upper edge, and
a pair of lower side edge portions lying in a common plane and extending in opposite directions from said lower central edge portion, and
a plurality of openings formed in said front panel spaced apart from one another and disposed in a clustered arrangement between and spaced from said upper and lower central edge portions such that said front panel provides a dashboard that integrates within the high profile motorcycle windscreen, said openings providing sites for mounting gauges thereto;
a tunnel having a front edge of arch-shaped configuration the same as said arch-shaped configuration of said lower central edge portion of said front panel, said front edge of said tunnel being rigidly connected to said lower central edge portion of said front panel, said tunnel having a truncated semi-conical cross-sectional configuration and extending from said front edge thereof to a rear edge thereof between a pair of longitudinal side edges of said tunnel which each flare outwardly away from one another going in a rearward direction from a minimum diameter at said front edge of said tunnel to a maximum diameter at said rear edge of said tunnel so as to form a passageway through which to view a gauge mounted on an instrument panel board of the motorcycle; and
a base having a pair of side base portions spaced apart and disposed along opposite sides of said tunnel, each of said side base portions having a respective front edge and an inner longitudinal edge rigidly interconnecting one of said lower side edge portions of said lower edge of said front panel with an adjacent one of said longitudinal side edges of said tunnel so as to bolster structural rigidity of said upright front panel to support gauges mount hereto at the sites of said openings thereon.

In a further aspect of the present invention, a gauge-mountable motorcycle windscreen includes:
a high profile windscreen having a semi-conical wedge-shaped shell portion of a curved configuration;
a multi-gauge pod including
a front panel having
an upper edge of a curved configuration conforming to the curved configuration of the semi-conical wedge-shaped shell portion of the high profile motorcycle windscreen,
a lower edge below and spaced from the upper edge, and
a plurality of openings formed in the front panel spaced apart from one another and disposed in a clustered arrangement between and spaced from the upper and lower edges such that the front panel provides a dashboard that integrates within the shell portion of the high profile motorcycle windscreen, the openings providing sites for mounting gauges thereto; and
a base rigidly connected along a front edge thereof to the lower edge of the front panel and extending rearward therefrom so as to rigidly support the front panel in an upright position relative to the base, the base being attachable to one of the motorcycle and high profile motorcycle windscreen along opposite side edges of the base.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PREFERRED IMPLEMENTATIONS

Figure 1:
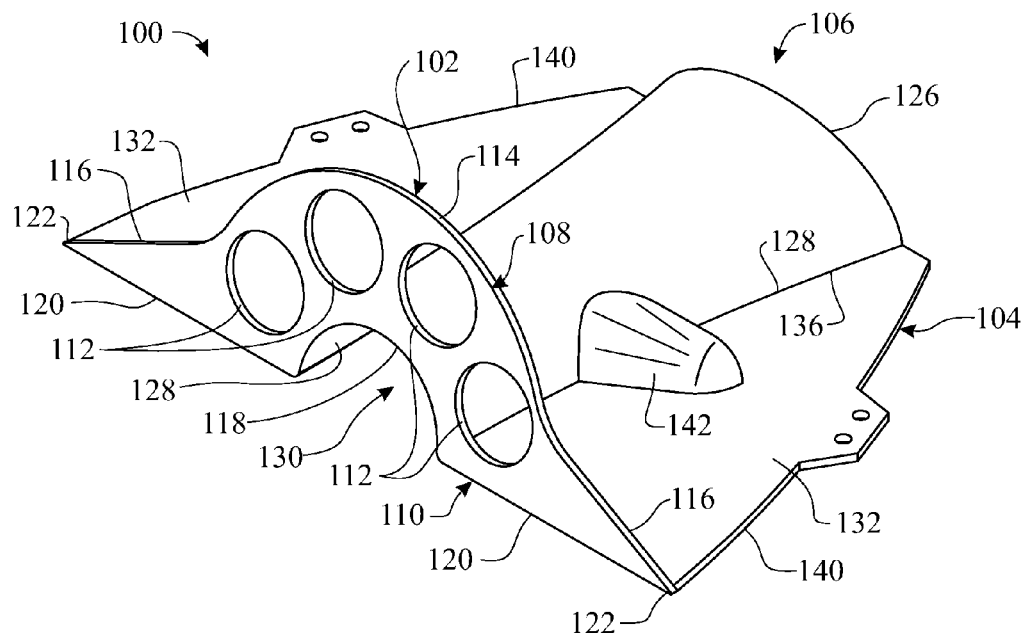
FIG. 1 presents a top front isometric view of an exemplary embodiment of a multi-gauge pod in accordance with the present invention.
Figure 2:
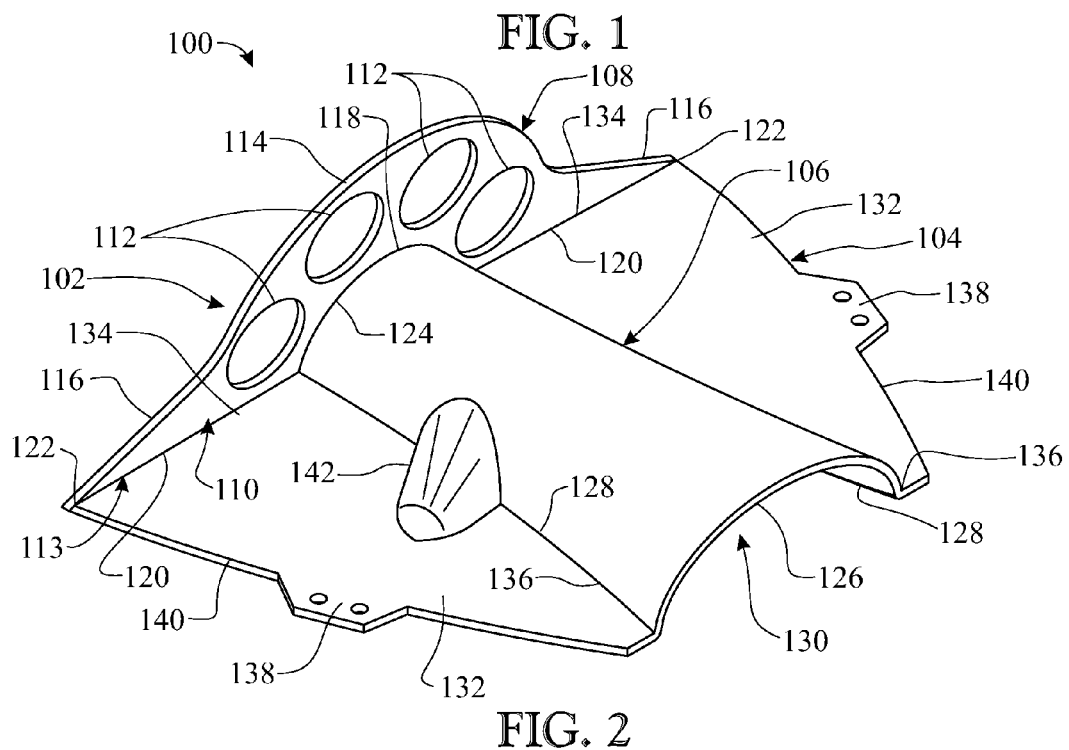
FIG. 2 presents a top rear view of the pod originally introduced in FIG. 1.
Figure 3:
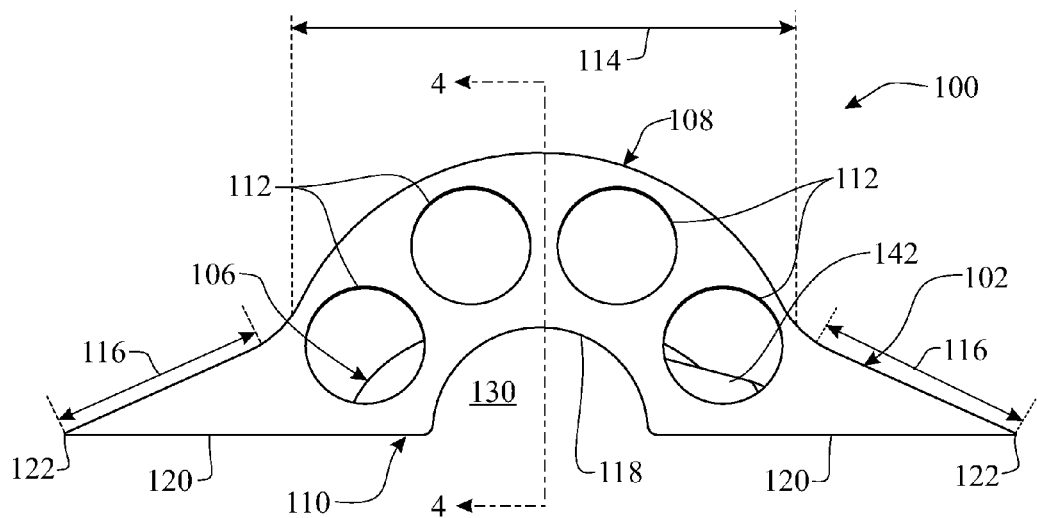
FIG. 3 presents a front elevation view of the pod originally introduced in FIG. 1.
Figure 4:
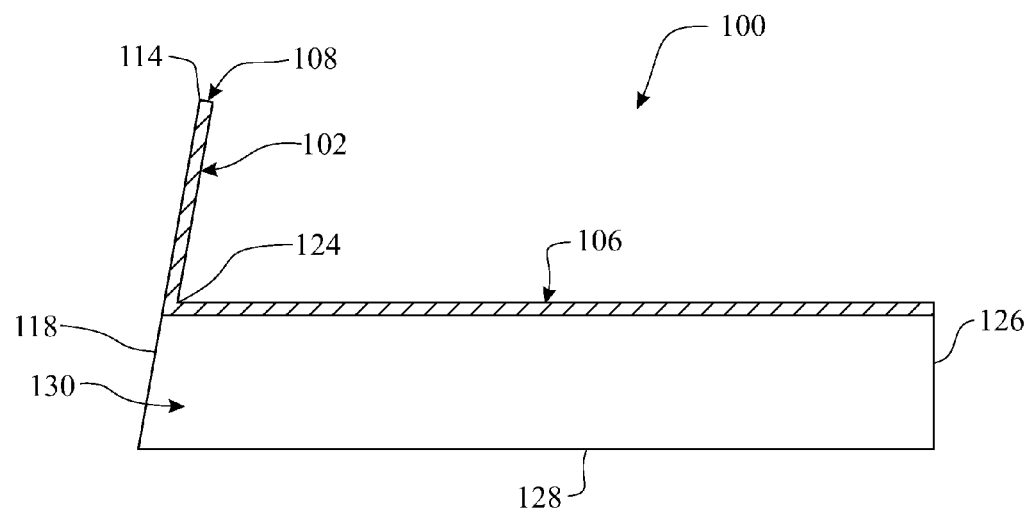
FIG. 4 presents a longitudinal sectioned side view of the pod taken along line 4-4 in FIG. 3.
Figure 5:
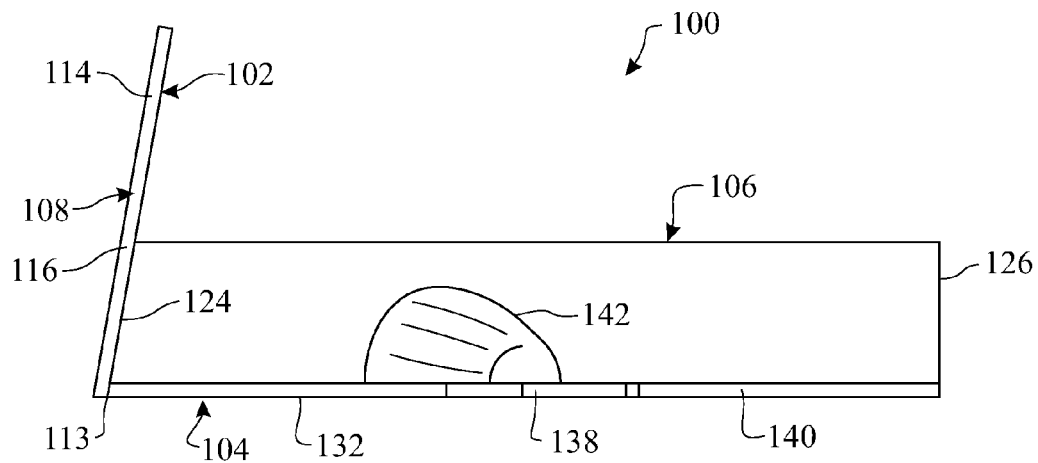
FIG. 5 presents a side elevation view of the pod as seen from the right side of the pod in FIG. 3.
Figure 6:
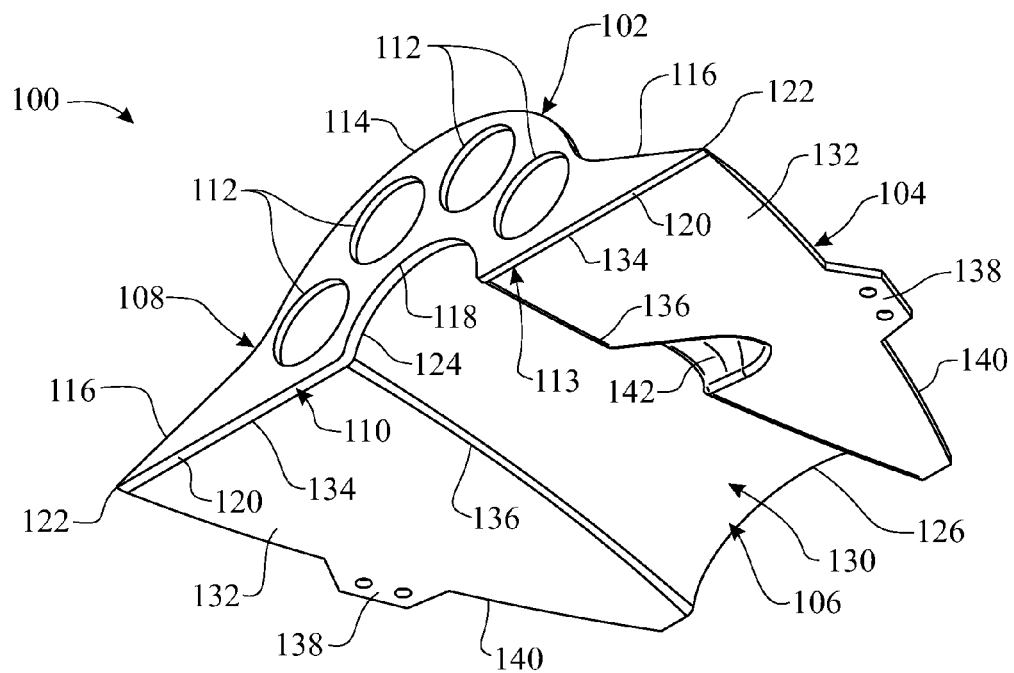
FIG. 6 presents a bottom front isometric view of pod originally introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 7:
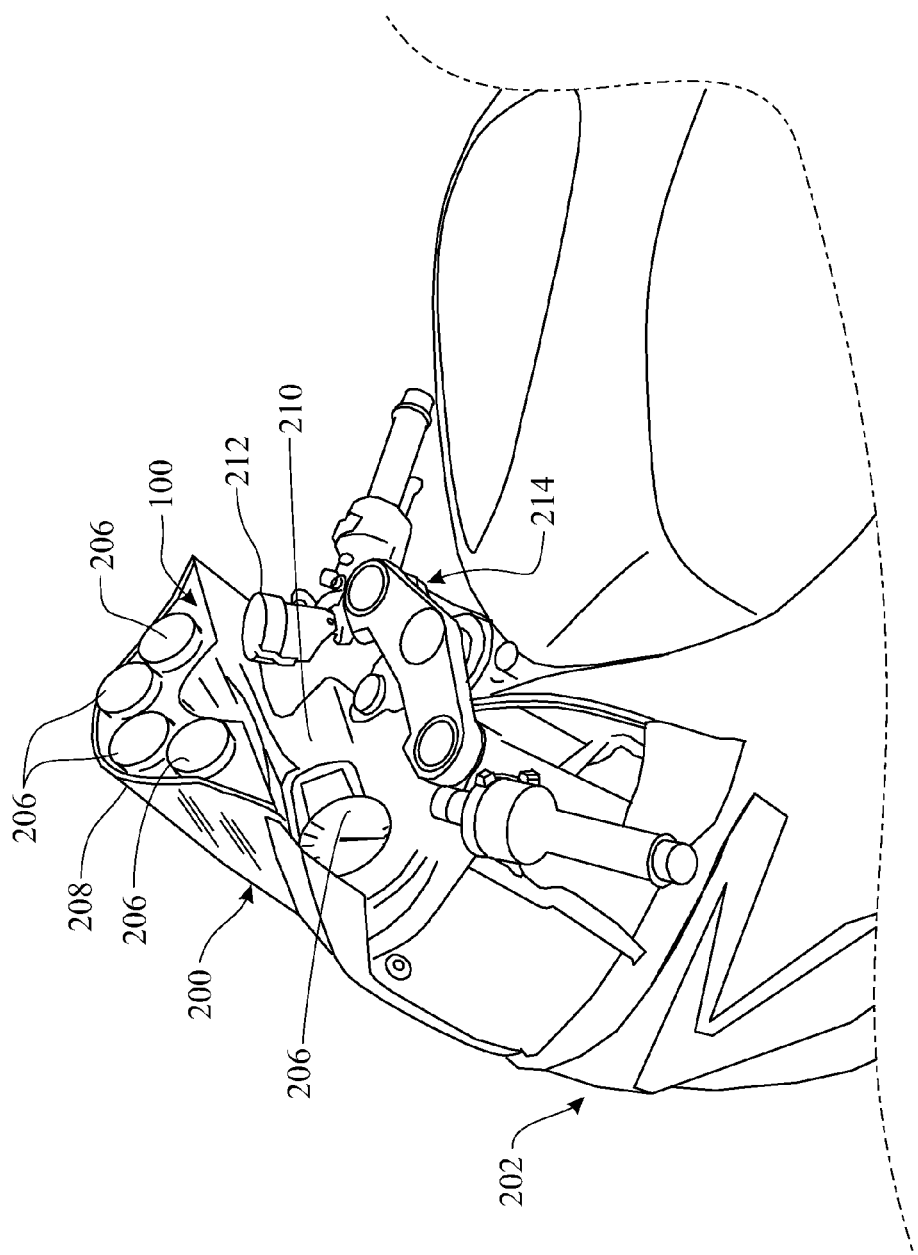
FIG. 7 presents a perspective view of an upper front portion of a motorcycle showing the multi-gauge pod integrated within a high profile windscreen on the motorcycle.
Figure 8:
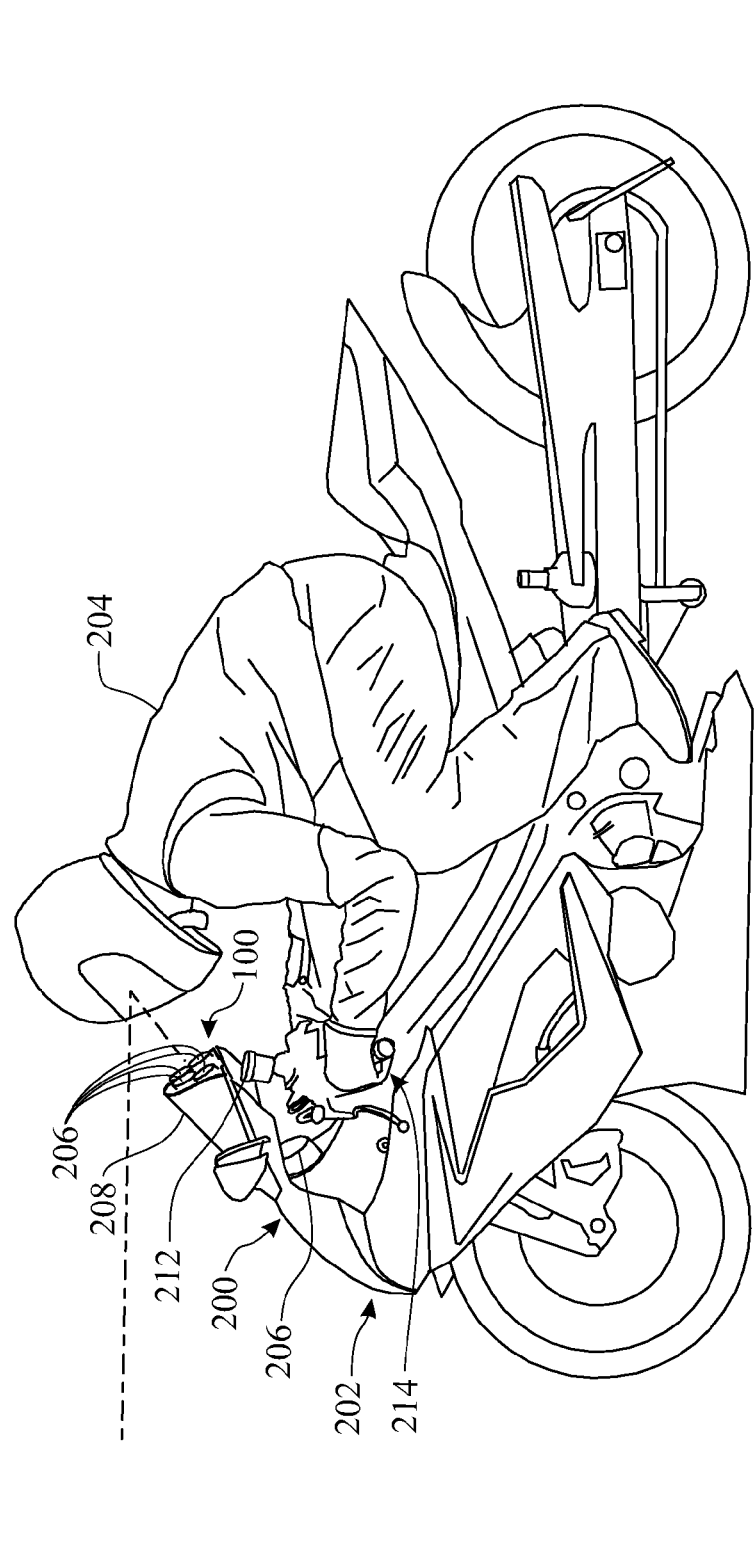
FIG. 8 presents a side elevation view of a motorcycle employing the multi-gauge pod integrated with a high profile windscreen, showing a motorcycle rider, while in a crouched position, able to view the gauges without having to look down.
Figure 9:
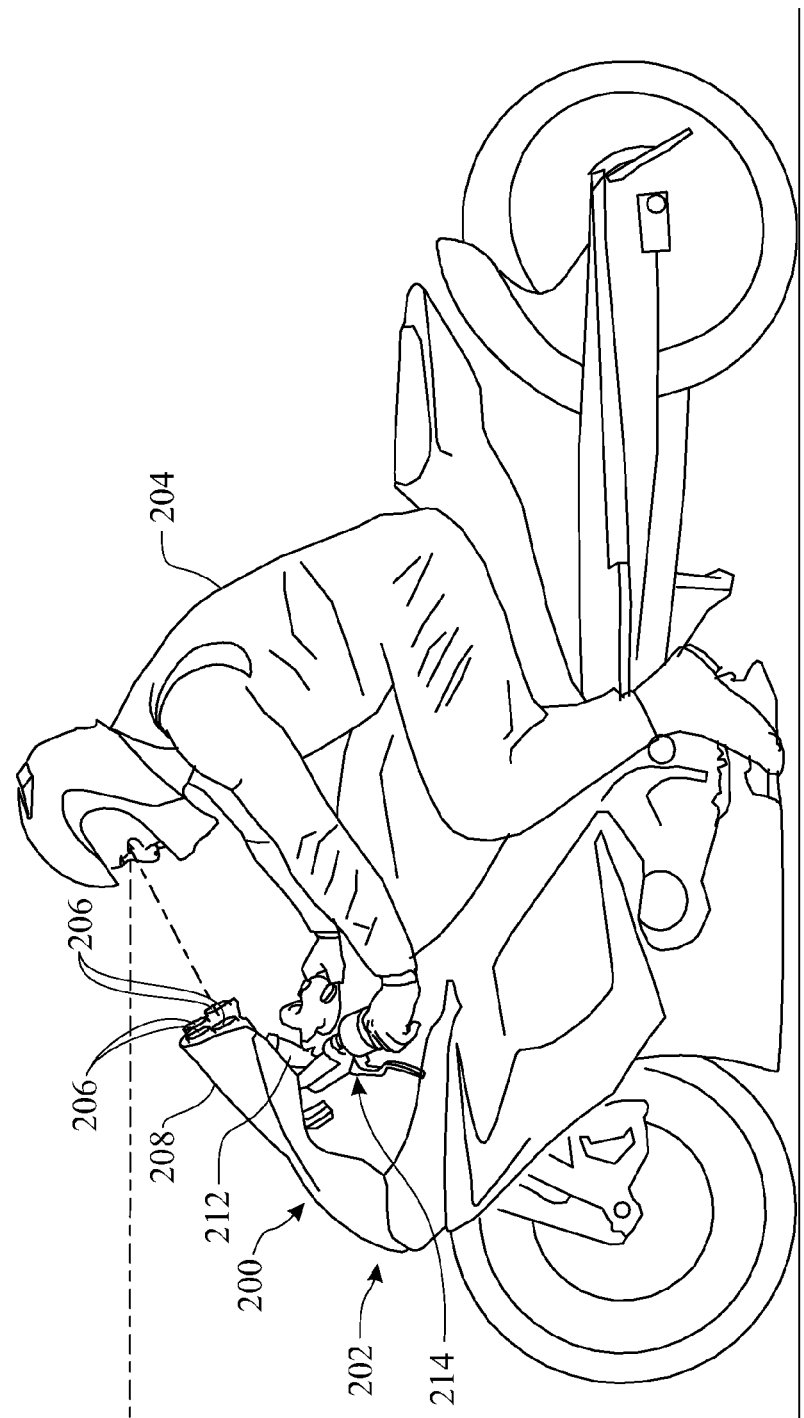
FIG. 9 presents a side elevation view of a motorcycle employing the multi-gauge pod integrated with a high profile windscreen, showing a motorcycle rider, while in an upright position, able to view the gauges without having to look down.

Referring now to FIGS. 1-6, there is illustrated a multi-gauge pod, generally designated 100, in accordance with the present invention. The multi-gauge pod 100 basically includes a front panel 102 and a base 104. Also, the multi-gauge pod 100 may additionally include a tunnel 106. In FIG. 7, the multi-gauge pod 100 is shown integrated within a motorcycle high profile style windscreen 200 on an upper front portion of a motorcycle 202. In FIG. 8 the motorcycle 202 is shown with the multi-gauge pod 100 integrated within the high profile windscreen 200, with a motorcycle rider 204, in a crouched position on the motorcycle 202, being able to view gauges 206 disposed in a clustered arrangement on the multi-gauge pod 100 without the rider 204 having to look down. In FIG. 9 a motorcycle 202 is shown with the multi-gauge pod 100 integrated within the high profile windscreen 200, with the motorcycle rider 204, in an upright position on the motorcycle 202, being able to view the gauges 206 disposed in the same clustered arrangement on the multi-gauge pod 100 without the rider 204 having to look down.

The front panel 102 of the multi-gauge pod 100 has an upper edge 108, a lower edge 110 below and spaced from the upper edge 108, and a plurality of openings 112 formed in the front panel 102 in spaced apart relationships with respect to one another and disposed in a clustered arrangement between and spaced from the upper and lower edges 108, 110. The upper edge 108 of the front panel 102 is of a curved configuration conforming to the curvature of a semi-conical wedge-shaped shell portion 208 of the motorcycle windscreen 200. The front panel 102, in effect, provides a dashboard that integrates within the high profile motorcycle windscreen 200. The openings 112 provide sites for mounting the gauges 206 to the front panel 102.

The base 104 of the multi-gauge pod 100 has a front edge 114 where the base 104 is rigidly connected to the lower edge 110 of the front panel 102 so as to rigidly support the front panel 102 in an upright position relative to the base 104 in which the front panel 102 is slightly slanted rearward from a right angle position relative to the base 104. The base 104 is attachable to either one of the front portion of the motorcycle 202 or the motorcycle windscreen 200 along opposite outer side edges 116 of the base 104. In designs of the multi-gauge pod 100 which have no need for the tunnel 106, such as where there is no underlying gauge on the body of the motorcycle 202 that might be blocked by the presence of the pod 100 so that then the tunnel 106 could be omitted, the lower edge 110 of the front panel 102 and the front edge 113 of the base 104 would extend continuously without interruption and being rigidly connected together would necessarily occupy a common plane which also would be occupied by the remainder of the base 104. In other words, the base 104 would take the form of a single flat component (as if the tunnel 106 were flattened).

More particularly, the upper edge 108 of the front panel 102 has an upper central edge portion 114 having the curved configuration, such as an arch-shaped configuration, and a pair of upper side edge portions 116 sloping outwardly in declining fashion in opposite directions from the upper central edge portion 114 so as to conform the curvature of the upper edge 108 of the front panel 102 to the curvature of the semi-conical wedge-shaped shell portion 208 of the motorcycle windscreen 200, as seen in FIG. 7.

In designs of the multi-gauge pod 100 which have need for the tunnel 106 and thus incorporate it as shown in FIGS. 1-7, the lower edge 110 of the front panel 102 has a lower central edge portion 118 having the curved configuration, such as the arch-shaped configuration, and being spaced below the upper central edge portion 114, and a pair of lower side edge portions 120 lying in a common plane and extending in opposite directions from the arch-shaped lower central edge portion 118. Each lower side edge portion 120 extends between the arch-shaped lower central edge portion 118 and one of the upper side edge portions 116 so as to intersect with the upper side edge portions 116 and form outer corners 122 each having an acute angular configuration. The openings 112 are formed in the front panel 102 in the spaced apart relationships with respect to one another and disposed in the curved configuration, such as an arch-shaped arrangement. The openings 112 provide sites for mounting the gauges 208 to the front panel 102 using well-known mounting techniques.

The tunnel 104 has a front edge 124 of an arch-shaped configuration the same as the arch-shaped configuration of the lower central edge portion 118 of the lower edge 110 of the front panel 102. The front edge 124 of the tunnel is rigidly connected to the arch-shaped lower central edge portion 118 of the front panel 102. The tunnel 106 has a truncated semi-conical cross-sectional configuration and extends from the front edge 124 thereof to a rear edge 126 thereof between a pair of longitudinal side edges 128 of the tunnel 106. The longitudinal side edges 128 of the tunnel 106 each intersects with one of the lower side edge portions 120 of the lower edge 110 of the front panel 102. The longitudinal side edges 128 of the tunnel 106 flare outwardly away from one another going in a rearward direction from a minimum diameter at the front edge 124 of the tunnel 106 to a maximum diameter at the rear edge 126 of the tunnel 106 so as to form a passageway 130 through which to view a gauge 206 mounted on an instrument panel 210 of the motorcycle 202 below and behind the tunnel 106 of the pod 100.

When the tunnel 104 is employed in the design, as shown in FIGS. 1-7 the base 104 takes the form of a pair of side base portions 130. Each of the side base portions 130 of the base 104 at a respective front edge 134 and inner longitudinal edge 136 rigidly interconnect one of the lower side edge portions 120 of the lower edge 110 of the front panel 102 with an adjacent one of the longitudinal side edges 128 of the tunnel 106 so as to bolster the structural rigidity of the upright front panel 102 with the gauges 206 (see FIG. 7) mount thereto at the sites provided by the openings 112 thereon. The side base portions 130 lie in the common plane of the lower side edge portions 120 of the lower edge 110 of the front panel 102. The side base portions 130 of the base 104 also have tabs 138 at opposite locations on the opposite outer longitudinal edges 140 of the side base portions 132 extending between and intersecting with the lower side edge portions 120 of the lower edge 110 of the front panel 102 and the rear edge 126 of the tunnel 106.

The multi-gauge pod 100 of FIGS. 1-6, being an exemplary embodiment, shows one combination of shapes that the front panel 102, base 104 and tunnel 106 may have. The modification of their shapes will depend upon the requirements imposed by the location of any gauges on the body of the motorcycle as well as the particular shape of the high profile windscreen 200. Preferably, the multi-gauge pod 100 is fabricated from a carbon fiber or a sufficiently rigid polymer. However, as will be apparent to those skilled in the art, other suitable materials, including metals, such as stainless steel or aluminum, can be used without departing from the scope of the invention. Also, it will be noted that there is a recess 142 in the pod 100 that intersects the tunnel 106 and one of the side base portions 132 of the base 104. The reason for the recess 142 is to accommodate interference with a nearby component 212 protruding from the handlebar steering mechanism 214 of the motorcycle 202.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims. For example, one contemplated implementation of the invention incorporates, in lieu of openings 112 for receiving analog gauges, a display (such as, for example, a Liquid Crystal Display (LCD)) integrated into the front panel 102, which may have an curved upper edge analogous to front edge 114 conforming to interior surface of a motorcycle windscreen in similar manner to front edge 114. In that case, the overall structure of the gauge pod is identical with the exception that the front panel with gauge receiving opening is replaced by an electronic display for displaying, for instance, Speed, RPMs, Gear and the like.

What is claimed is:

1. A gauge pod integratable within a high profile motorcycle windscreen of a motorcycle, said pod comprising:
   a front panel having
      an upper edge having an upper central edge portion of a curved configuration conforming to a curvature of a semi-conical wedge-shaped shell portion of the high profile motorcycle windscreen,
      a lower edge below and spaced from said upper edge, said lower edge having a lower central edge portion of a curved configuration spaced below said upper central edge portion, and
      at least one opening formed in said front panel, said at least one opening being disposed between and spaced from said upper and lower edges such that said front panel integrates with the high profile motorcycle windscreen in a manner facilitating use of said front panel as a conventional motorcycle dashboard;
   a base rigidly connected along a front edge thereof to said lower edge of said front panel and extending rearward therefrom so as to rigidly support said front panel in an upright position relative to said base, said base being attachable to one of the motorcycle and high profile motorcycle windscreen along opposite outer side edges of said base; and a tunnel having a front edge of a curved configuration the same as said curved configuration of said lower central edge portion of said front panel, said front edge of said tunnel being rigidly connected to said lower central edge portion of said front panel.

2. The pod of claim 1 wherein said upper edge of said front panel also has a pair of upper side edge portions sloping outwardly in declining fashion in opposite directions from said upper central edge portion.

3. The pod of claim 1 wherein said lower edge of said front panel also has a pair of lower side edge portions lying in a common plane and extending in opposite directions from lower central edge portion.

4. The pod of claim 1 wherein said at least one opening includes a plurality of openings formed in said front panel spaced apart from one another and disposed in a curved arrangement between said curved upper and lower central edge portions of said front panel.

5. The pod of claim 1 wherein said tunnel also has a truncated semi-conical cross-sectional configuration and extends from said front edge thereof to a rear edge thereof between a pair of longitudinal side edges of said tunnel which flare outwardly away from one another going in a rearward direction from a minimum diameter at said front edge of said tunnel to a maximum diameter at said rear edge of said tunnel.

6. The pod of claim 5 wherein said tunnel provides a passageway through which to view a gauge mounted on an instrument panel board of the motorcycle.

7. The pod of claim 1 wherein said base comprises a pair of side base portions each having a respective front edge and an inner longitudinal edge that intersect with each other rigidly interconnecting one of a pair of lower side edge portions of said lower edge of said front panel with an adjacent one of said longitudinal side edges of said tunnel.

8. The pod of claim 7 wherein said side base portions of said base lie in a common plane.

9. The pod of claim 8 wherein said side base portions of said base have opposite outer longitudinal edges and tabs at opposite locations on said opposite outer longitudinal edges where said pod is attachable to one of the motorcycle and high profile motorcycle windscreen.

10. A gauge pod integratable within a high profile motorcycle windscreen of a motorcycle, said pod comprising:
a front panel having
an upper edge having an upper central edge portion of an arch-shaped configuration conforming to the configuration of a semi-conical wedge-shaped shell portion of a high profile motorcycle windscreen,
a lower edge having a lower central edge portion of an arch-shaped configuration spaced below said upper central edge portion of said upper edge and spaced from said upper edge, and a pair of lower side edge portions lying in a common plane and extending in opposite directions from said lower central edge portion, and
at least one opening formed in said front panel, said at least one opening being disposed between and spaced from said upper and lower edges such that said front panel integrates with the high profile motorcycle windscreen in a manner facilitating use of said front panel as a conventional motorcycle dashboard;
a tunnel having a front edge of arch-shaped configuration the same as said arch-shaped configuration of said lower central edge portion of said front panel, said front edge of said tunnel being rigidly connected to said lower central edge portion of said front panel, said tunnel having a truncated semi-conical cross-sectional configuration and extending from said front edge thereof to a rear edge thereof between a pair of longitudinal side edges of said tunnel which each flare outwardly away from one another going in a rearward direction from a minimum diameter at said front edge of said tunnel to a maximum diameter at said rear edge of said tunnel; and
a base having a pair of side base portions spaced apart and disposed along opposite sides of said tunnel, each of said side base portions having a respective front edge and an inner longitudinal edge rigidly interconnecting one of said lower side edge portions of said lower edge of said front panel with an adjacent one of said longitudinal side edges of said tunnel.

11. The pod of claim 10 wherein said upper edge of said front panel also has a pair of upper side edge portions sloping outwardly in declining fashion in opposite directions from said upper central edge portion.

12. The pod of claim 10 wherein said side base portions of said base lie in said common plane of said lower side edge portions of said lower edge of said front panel.

13. The pod of claim 10 wherein said side base portions of said base have opposite outer longitudinal edges and tabs at opposite locations on said opposite outer longitudinal edges where said pod is attachable to one of the motorcycle and high profile motorcycle windscreen.

14. A gauge-mountable motorcycle windscreen of a motorcycle, said gauge-mountable motorcycle windscreen comprising:
a high profile windscreen shell having a semi-conical wedge-shaped shell portion of a curved configuration; and
a gauge pod comprising
a front panel including an upper edge having an upper central edge portion of a curved configuration conforming to said curved configuration of said semi-conical wedge-shaped shell portion of said high profile motorcycle windscreen, a lower edge below and spaced from said upper edge, said lower edge having a lower central edge portion of a curved configuration spaced below said upper central edge portion, and at least one opening formed in said front panel, said at least one opening being disposed between and spaced from said upper and lower edges such that said front panel integrates with the high profile motorcycle windscreen in a manner facilitating use of said front panel as a conventional motorcycle dashboard; and
a base rigidly connected along a front edge thereof to said lower edge of said front panel and extending rearward therefrom so as to rigidly support said front panel in an upright position relative to said base, said base being attachable to one of the motorcycle and high profile motorcycle windscreen along opposite side edges of said base; and
a tunnel having a front edge of a curved configuration the same as said curved configuration of said lower central edge portion of said front panel, said front edge of said tunnel being rigidly connected to said lower central edge portion of said front panel.

15. The pod of claim 14 wherein said tunnel also has a truncated semi-conical cross-sectional configuration and extends from said front edge thereof to a rear edge thereof between a pair of longitudinal side edges of said tunnel which flare outwardly away from one another going in a rearward direction from a minimum diameter at said front edge of said tunnel to a maximum diameter at said rear edge of said tunnel.

16. The pod of claim 4 wherein said base comprises a pair of side base portions each having a respective front edge and an inner longitudinal edge that intersects with each other rigidly interconnecting one of a pair of lower side edge portions of said lower edge of said front panel with an adjacent one of said longitudinal side edges of said tunnel.

17. The pod of claim 14 wherein said side base portions of said base have opposite outer longitudinal edges and tabs at opposite locations on said opposite outer longitudinal edges where said pod is attachable to one of the motorcycle and high profile motorcycle windscreen.

* * * * *